May 6, 1952  J. R. BARROW  2,596,005

SKID SUPPORTED TANK

Filed April 11, 1949

INVENTOR.
James R. Barrow
BY
ATTORNEY

Patented May 6, 1952

2,596,005

UNITED STATES PATENT OFFICE 2,596,005

SKID SUPPORTED TANK

James R. Barrow, Columbiana, Ohio, assignor to The Columbiana Boiler Company, Columbiana, Ohio, a corporation of Ohio Application April 11, 1949, Serial No. 86,669

1 Claim. (Cl. 280—5)

This invention relates to a tank or container, and more particularly to a tank for safely storing and transporting gases or liquids.

The object of the invention is to provide a plurality of skids which are adapted to be detachably attached to a tank for storing liquids or gases under pressure, whereby the skids provide a support for the tank, and also facilitate loading or unloading of the tank from freight cars, trucks, barges, ships and the like.

Another object of the invention is to provide skids for tanks holding liquids or gases under pressure, the skids being adapted to support or facilitate movement of the tank when attached to the latter, or when the skids are not needed, the skids can be detached whereby the tank or container can be rolled to the desired location.

A further object of the invention is to provide a tank or container which is extremely simple and inexpensive to manufacture.

Other objects and advantages will be apparent during the course of the following description.

In the accompanying drawings, forming a part of this application, and in which like numerals are used to designate like parts throughout the same:

Referring in detail to the drawings, the numeral 10 designates a tank or container for holding liquids or gases under pressure, and the tank may have a structure similar to the structure described in my co-pending application titled Tank or Container, Serial Number 67,719, filed December 28, 1948.

Figure 1:
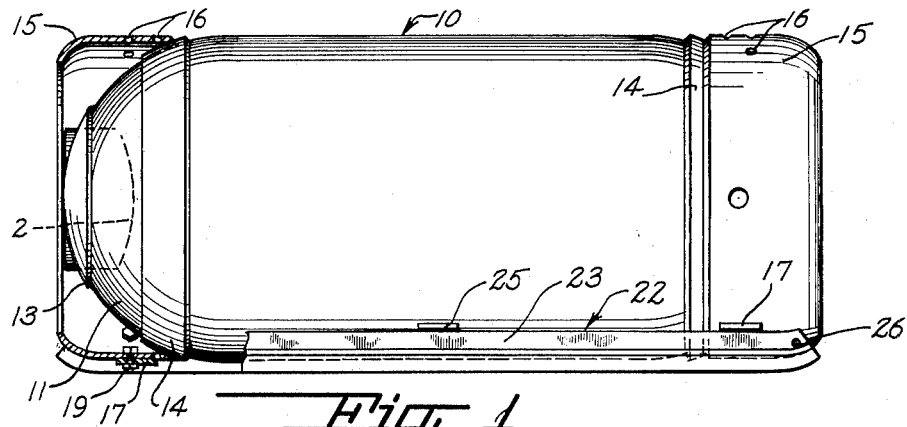
Figure 1 is a side elevational view of a tank equipped with the skids, and with parts broken away and in section.
Figure 2:
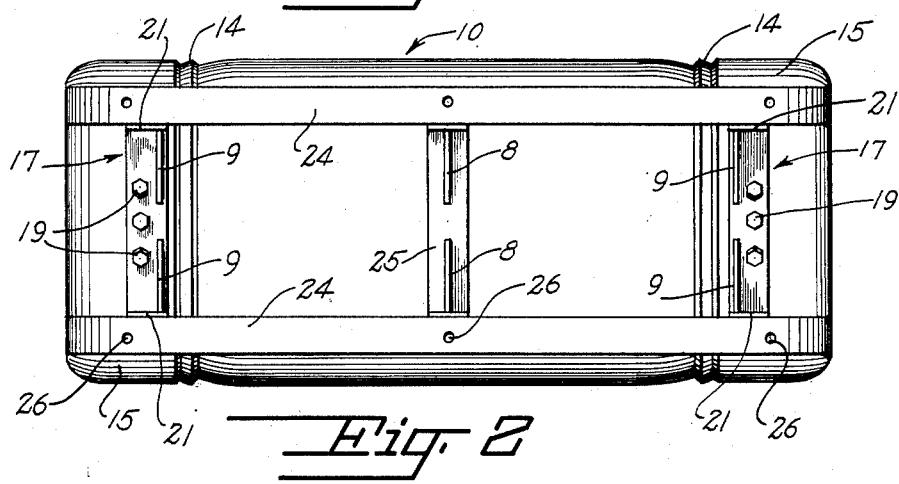
Figure 2 is a bottom plan view of the tank with the skids thereon.
Figure 3:
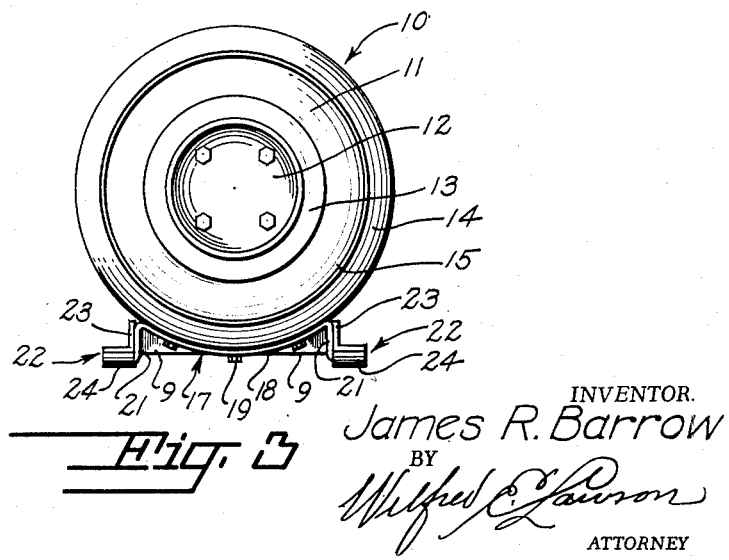
Figure 3 is an end elevational view of the tank.

The present invention is directed to a tank which has skids releasably or detachably connected thereto, and the skids serve to facilitate the movement of the tank when attached to the latter. The tank 10 is especially suitable for transporting and storing gases and fluids under pressure, and is constructed with numerous safety features and has a rugged construction so that the danger of the tank rupturing will be minimized. The tank 10 includes a cylindrical shell which may be made up of a plurality of plates secured together at their seams, or may be fabricated from seamless tubing. The ends of the shell or tubing are chimed or formed inwardly as at 11, Figure 1, or a hemispherically shaped section 11 is secured to the shell to partially close the ends of the tank 10 and provide an opening to receive the convex head 12, there being one of the heads 12 arranged on each end of the tank 10. In the event that the pressure in the tank or container exceeds a predetermined degree the heads 12 will reverse or assume a concave shape so that rupture of the tank will be prevented, and the head may be provided with various safety valves, as described in detail in my co-pending application.

Arranged exteriorly of the tank 10 and arranged in surrounding relation with respect to each of the heads 12, is a circular plate 13, the plate 13 serving to reinforce the ends of the tank. A pad 14 is arranged contiguous to each end of the tank 10 and the pad 14 conforms in shape to the exterior surface of the tank. The pad 14 is secured, as by welding, to the exterior of the tank and helps to strengthen the latter. The pad 14 also provides a support for a chimed ring or strap 15. One of the chimed rings 15 engages over each end of the tank 10, and the rings 15 are each provided with several spaced openings 16' which may serve as drainage openings.

Other openings 16 provide a means whereby the skids can be detachably connected to the tank 10. Thus, there is a cross bar 17 which is adapted to be releasably or detachably connected to the chimed ring 15, there being one of the cross bars 17 for attachment to each of the rings 15. The cross bar 17 includes an arcuate portion 18 which forms a cradle for embracingly receiving a portion of the chimed ring 15 and a plurality of bolt and nut assemblies 19 project through suitable openings in the arcuate portion 18 of the cross bar 17, and through the openings 16 in the chimed ring 15 for maintaining the parts in assembled relation. Each cross bar 17 has strengthening ribs 9, and each of the cross bars 17 terminates in a pair of transversely spaced legs 21. Secured to the legs 21, as by welding, is a pair of spaced parallel skids 22. The chine rings 15 are held tightly against the pads 14 on the end of the tank, when the cross bars 17 are secured thereto by the elements 19.

The skids 22 are L-shaped and include a vertically disposed portion 23 which is secured, as by welding, to the legs 21, and the skids 22 also each include a horizontally disposed ground engaging portion 24, the outer end of each of the portions 24 being curved upwardly to prevent the skids from becoming engaged with, or entangled in any obstructions. An additional cross bar 25 has its ends secured to the skids 22, as by welding, and the cross bar 25 is arranged in spaced parallel relation between the pair of end cross bars 17, the cross bar 25 providing an additional support for the skids 22. The cross bar 25 is also provided with ribs 8 for reinforcing or bracing the latter.

The skids 22 are each provided with a plurality of openings 26 which are adapted to receive holding clamps, latches, or bolts, as the occasion requires.

The chimed rings 15 are especially useful for moving or lifting the tanks or containers, since the chimed rings can be conveniently gripped by any suitable lifting device, such as a crane. The chimed rings 15 are also adapted to be engaged by suitable clamps for fastening the tanks or containers to certain types of railway cars, the rings 15 being chimed or curved inwardly to prevent disengagement of said clamp. The chimed rings 15 also serve as a base when the tank or container is used in a vertical position. Further, the chimed rings 15 help to protect the ends of the tank. The bolt and nut assemblies 19 can be used for readily attaching the skids 22 to the tank so that the tank can be readily moved from place to place as desired. Further, the skids can be removed when not needed and the pressure vessel can then be rolled from one location to another.

What I claim:

In combination, a cylindrical tank having rounded ends and a supporting skid structure, said skid structure comprising a pair of parallel runners, cross bars connecting said runners, one cross bar toward each of the ends of said runners and one medially between said ends, each of said cross bars being of arcuate form between its ends to provide a seat for the tank and having its ends downwardly angled to form legs for securement to said runners, a vertical, longitudinally disposed strengthening rib formed at each end of the lower side of the arcuate portion of each of said cross bars immediately inward of the adjacent of said legs, a chine ring engaged over each end of the tank and secured to the adjacent of said cross bars, and annular pads encircling the ends of the tank and sloping downwardly and outwardly to provide shock-proof bearings against which the chine rings are wedgingly engaged when the same are secured to the said cross bars.

JAMES R. BARROW.

REFERENCES CITED

The following references are of record in the file of this patent:

UNITED STATES PATENTS

| Number | Name | Date |
|---|---|---|
| 1,341,216 | Kramer | May 25, 1920 |
| 1,704,662 | Flannery | Mar. 5, 1929 |
| 1,768,186 | Unuk | June 24, 1930 |
| 2,076,585 | Merker | Apr. 13, 1937 |
| 2,157,693 | Ernolf | May 9, 1939 |
| 2,166,134 | Fitch | July 18, 1939 |
| 2,417,979 | Gilmore | Mar. 25, 1947 |

FOREIGN PATENTS

| Number | Country | Date |
|---|---|---|
| 101,484 | Sweden | Apr. 29, 1941 |